United States Patent
Okui

(10) Patent No.: US 8,018,746 B2
(45) Date of Patent: Sep. 13, 2011

(54) PARALLEL INVERTER SYSTEM

(75) Inventor: Yoshiaki Okui, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 479 days.

(21) Appl. No.: 12/356,257

(22) Filed: Jan. 20, 2009

(65) Prior Publication Data
US 2009/0185400 A1 Jul. 23, 2009

(30) Foreign Application Priority Data
Jan. 21, 2008 (JP) .................. 2008-010393

(51) Int. Cl.
*H02M 7/48* (2007.01)
(52) U.S. Cl. .............. 363/71; 363/65; 323/207; 307/64; 307/82
(58) Field of Classification Search .............. 363/17, 363/65, 50, 55, 71, 95, 97, 37; 323/207, 323/265, 272, 276; 307/64, 82, 102, 165
See application file for complete search history.

(56) References Cited

U.S. PATENT DOCUMENTS

| | | | |
|---|---|---|---|
| 5,191,519 A * | 3/1993 | Kawakami ............. | 363/71 |
| 5,267,138 A * | 11/1993 | Shores ............. | 363/98 |
| 5,446,645 A * | 8/1995 | Shirahama et al. ........ | 363/71 |
| 5,781,419 A * | 7/1998 | Kutkut et al. ............ | 363/17 |
| 6,496,394 B2 | 12/2002 | Hanaoka et al. | |
| 6,731,524 B2 * | 5/2004 | Elek et al. ............ | 363/70 |

FOREIGN PATENT DOCUMENTS

| JP | 02-101932 | 4/1990 |
|---|---|---|
| JP | 2004-015923 | 1/2004 |
| JP | 2004-336856 | 11/2004 |

* cited by examiner

*Primary Examiner* — Rajnikant Patel
(74) *Attorney, Agent, or Firm* — Rankin, Hill & Clark LLP

(57) ABSTRACT

A parallel inverter system needs neither a dedicated line for synchronizing common portions nor switching operations, and includes a plurality of inverter units operating in parallel. An inverter control circuit of each inverter unit includes a sinusoidal signal generating circuit, a PWM control signal generating circuit, a phase difference circuit, a frequency difference circuit, and a feedback circuit. The feedback circuit inputs to the sinusoidal signal generating circuit an addition result value which is obtained by adding to a commanded value for reference frequency a value obtained from multiplication of a phase difference by a predetermined gain and a value obtained from multiplication of a frequency difference by a predetermined gain. The phase difference among outputs from the inverter units occurring in the parallel operation of the inverter units is reduced by changing the output frequencies of the inverter units.

8 Claims, 8 Drawing Sheets

PARALLEL INVERTER SYSTEM

FIELD OF THE INVENTION

The present invention relates to a parallel inverter system including a plurality of inverter units which are connected in operation and operating in parallel or parallelly.

BACKGROUND OF THE INVENTION

Japanese Patent Publication No. 06-40704 (JP06-40704) discloses a technology relating to "a method of operating inverters in parallel." The disclosed technology is directed to suppression of cross current flowing between the inverter units operating in parallel. The technology assumes that reference sinusoidal signals are substantially synchronized among the inverter units. In a standalone operation of the inverter units where a synchronized signal is not given to each of the inverter units and each unit is operating independently from others, parallel operation of the inverter units is not possible if the reference sinusoidal signals used in the units are not synchronized due to an error in a crystal oscillation circuit which generates the reference sinusoidal signal.

Japanese Patent Application Publication No. 2004-15923 (JP2004-15923A) titled "Power Conversion Apparatus Connecting a Plurality of Inverters in Parallel" discloses a technology relating to a dedicated signal line which allows the inverter units to share a synchronized signal. Japanese Patent Application Publication No. 2004-336856 (JP2004-336856A) titled "Uninterruptible Power Supply System" discloses a technology relating to synchronization of inverter units operating in parallel by switching a reference signal.

Japanese Patent No. 3825665 discloses a technology relating to suppression of cross current flowing between the inverter units operating in parallel, and describes under the Background Art section that the frequency accuracy of an output from each of inverter units operating in parallel decreases if the phase of an output voltage is changed according to varying effective power. In order to evenly distribute the load among the inverter units operating in parallel, it is necessary to provide a circuit, which is shared by the inverter units to distribute the varying load.

In a parallel operation of a plurality of inverter units, if a common portion or function or circuit shared by the inverter units fails to operate properly, all of the inverter units operating in parallel do not work properly, thereby causing an issue with lowered reliability. Switching operation may solve the issue, but the operation as a whole will become complicated, which may in turn bring about an issue with lowered reliability.

SUMMARY OF THE INVENTION

An object of the present invention is to provide a parallel inverter system capable of operating a plurality of inverter units in parallel or parallelly without the necessity of using a dedicated line, namely a common portion for synchronization and performing switching operation.

Another object of the present invention is to provide a parallel inverter system capable of maintaining frequency accuracy at a high level although the phase is changed in order to control cross current occurring in the parallel operation of the inverter units.

A parallel inverter system of which improvements are aimed comprises a plurality of inverter units which are connected in parallel and operating in parallel or parallelly to supply electric power to a load. Each of the inverter units comprises an inverter circuit including a plurality of semiconductor switching elements; a voltage detector which detects an output voltage of the inverter circuit: a current detector which detects an output current of the inverter circuit; and an inverter control circuit which outputs a PWM control signal for PWM controlling the semiconductor switching elements of the inverter circuit.

The inverter control circuit of the present invention includes a sinusoidal signal generating circuit, PWM control signal generating circuit, a phase difference detecting circuit, and a feedback circuit. The sinusoidal signal generating circuit generates a sinusoidal signal of frequency in accordance with a commanded value for reference frequency when the commanded value is inputted. If a counter is used to configure the sinusoidal signal generating circuit, the counter accuracy depends upon the accuracy of a crystal oscillator or the like. Consequently, the frequency of a signal outputted from the sinusoidal signal generating circuit of each inverter unit varies to some extent. Basically, the PWM control signal generating circuit receives an addition result signal which is obtained by adding a reference sinusoidal signal obtained by multiplying the sinusoidal signal by a predetermined coefficient and a gain-multiplied difference signal obtained by multiplying a difference signal between the reference sinusoidal signal and a detected voltage signal outputted from the voltage detector by a predetermined gain. Then, the PWM control signal generating circuit outputs the PWM control signal. The phase difference detecting circuit compares the detected voltage signal from the voltage detector with the reference sinusoidal signal, and obtains a phase difference between the detected voltage signal outputted from the voltage detector and the reference sinusoidal signal. The feedback circuit inputs an addition result value, which is obtained by adding to the commanded value for reference frequency a gain-multiplied phase difference value obtained by multiplying the phase difference value by a predetermined gain, to the sinusoidal signal generating circuit.

The feedback circuit of the present invention inputs to the sinusoidal signal generating circuit an addition result value which is obtained by adding to the commanded value for reference frequency the gain-multiplied phase difference value obtained by multiplying the phase difference by the predetermined gain and a gain-multiplied frequency difference value obtained by multiplying by a predetermined gain the frequency difference between the reference sinusoidal signal and the detected voltage signal in one inverter unit that is varied, being affected by outputs of other inverter units. Thus, the phase difference among the outputs of the inverter units operating in parallel may be reduced by varying the output frequencies of the inverter units. In one or more embodiments of the present invention, the output frequency of each inverter unit does not conform to the commanded value for reference frequency, but is close to a frequency indicated with the commanded value for reference frequency. As a result, the outputs of the inverter units are synchronized. In this configuration, a common function or circuit shared by the inverter units is not necessary and a dedicated line for synchronizing the inverter units is also not needed.

In order to allow the frequencies of the invert units to be consistent with each other as much as possible, in other words, to increase the frequency accuracy, a frequency difference detecting circuit may be provided to obtain a frequency from the detected voltage signal outputted from the voltage detector and detect a frequency difference between the obtained frequency and a frequency indicated with the commanded value for reference frequency. Further, the feedback circuit may be configured to input to the sinusoidal signal generating circuit an addition result value which is obtained by adding to the commanded value for reference frequency the gain-multiplied phase difference value and the gain-multiplied frequency difference value obtained by multiplying the frequency difference by the predetermined gain. In this configuration, the frequency difference information may also be fed back, thereby increasing the frequency accuracy.

Instead of the frequency difference detecting circuit, a means for storing a maximum frequency difference may be provided. The means for storing a maximum frequency difference stores a maximum frequency difference equivalent value which is equivalent to the maximum frequency difference defined by a circuit constant of the inverter circuit. In this configuration, the feedback circuit inputs an addition result value, which is obtained by adding the gain-multiplied phase difference value and the maximum frequency difference equivalent value to the commanded value for reference frequency, to the sinusoidal signal generating circuit. In this configuration, since the frequency difference information for the maximum frequency defined by the circuit constant may also be fed back, the frequency accuracy will be increased although the frequency accuracy is lower than the one when actually detecting the frequency difference.

The phase difference detecting circuit may include a difference signal detecting circuit which compares the gain-multiplied difference signal, which is obtained by multiplying a difference signal between the reference sinusoidal signal and the detected voltage signal outputted from the voltage detector by a predetermined gain, with the reference sinusoidal signal and obtains a phase difference equivalent difference signal which is equivalent to a phase difference between the detected voltage signal and the reference sinusoidal signal. The feedback circuit may be configured to input to the sinusoidal signal generating circuit an addition result value obtained by adding to the commanded value for reference frequency a value obtained by multiplying the phase difference equivalent difference signal by a predetermined gain and a value obtained by multiplying the frequency difference by a predetermined gain. If this difference detecting circuit is employed, the same result may be obtained as when the phase difference is directly obtained.

In order to increase the frequency accuracy, it is desirable to reduce cross current flowing among the inverter units as much as possible. Then, an effective value control circuit may preferably be provided to define the coefficient used to determine an amplitude value for the sinusoidal signal required for setting an output from the inverter circuit as an effective value indicated with a commanded value for a reference effective value, based on the commanded value for a reference effective value and an effective value for an output from the inverter circuit obtained based on an output from the voltage detector. Further, the PWM control signal generating circuit may preferably be configured to receive a subtraction result signal and output the PWM control signal. The subtraction result signal is obtained by subtracting a detected current signal obtained by multiplying an output from the current detector by a predetermined gain from an addition result signal obtained by adding the reference sinusoidal signal obtained by multiplying the sinusoidal signal by the predetermined coefficient and the gain-multiplied difference signal obtained by multiplying a difference signal between the reference sinusoidal signal and the detected voltage signal by the predetermined gain. In this configuration, effective values for the output voltages from the inverter units do not differ significantly. If the output current of each inverter unit is fed back to the PWM control signal generating circuit, the inverter units will operate in parallel with the load distributed thereamong so that an occurrence of cross current may be suppressed. The fundamental theory of distributed load is described in detail in Japanese Patent Publication No. 06-40704 (JP06-40704).

Other technologies which do not feed back the detected current to the PWM control signal generating circuit may, off course, be employed to suppress the cross current. For example, the inverter control circuit may include an effective power component detecting circuit which obtains an effective power component based on the detected voltage signal from the voltage detector and an output from the current detector. Further, the inverter control may include an effective value control circuit which defines the coefficient used to determine an amplitude value for the sinusoidal signal required for setting an output from the inverter circuit as an effective value indicated with the commanded value for a reference effective value, based on a value obtained by subtracting the effective power component from the commanded value for a reference effective value and an effective value for an output from the inverter circuit obtained based on the detected voltage signal from the voltage detector. Thus, an occurrence of the cross current may also be suppressed when the effective power component is subtracted from the reference effective value.

According to the present invention, by feeding back the phase difference between the reference sinusoidal signal and an output voltage from the inverter unit, synchronization among the inverter units may be done without transmitting and receiving a signal for controlling the cross current occurring among the inverter units. Therefore, according to the present invention, the inverter units may be operated in parallel by individually controlling the inverter units.

DETAILED DESCRIPTION OF PREFERRED EMBODIMENTS

Figure 1:
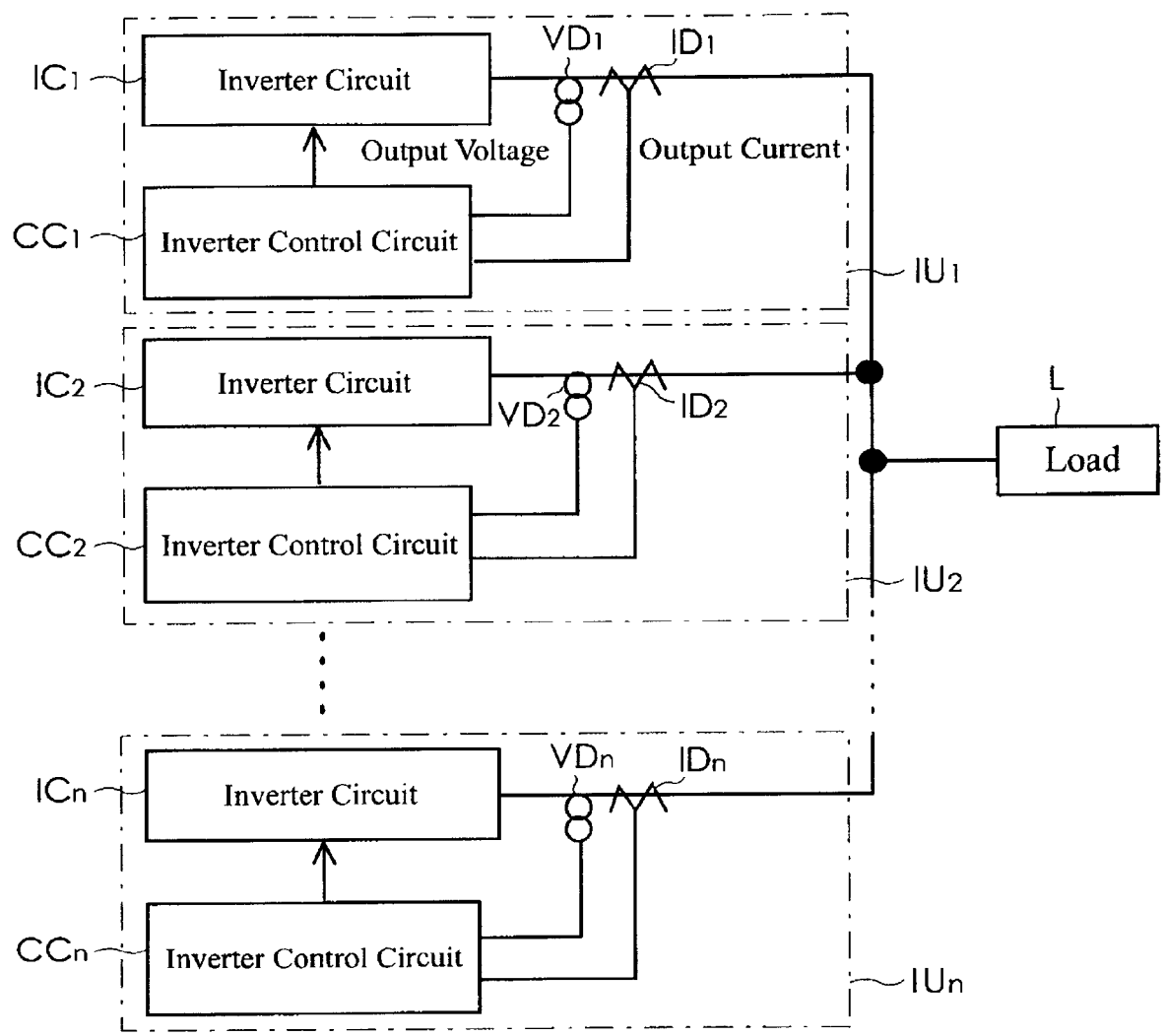
FIG. 1 is a schematic block diagram illustrating a configuration of a parallel inverter system according to the present invention.

Embodiments of the present invention will now be described in detail with reference to accompanying drawings. FIG. 1 is a block diagram illustrating a basic configuration of a parallel inverter system according to the present invention. As illustrated in FIG. 1, the parallel inverter system includes a plurality of inverter units IU1 to IUn which are connected in parallel. The inverter units IU1 to IUn is operating independently from each other in substantially a synchronized condition, without transmitting and receiving a synchronized signal for synchronizing the inverter units. In a normal operation, as a principle, the inverter units IU1 to IUn operating in parallel or parallelly supply electric power to a load L at a distribution rate of substantially one-nth (1/n). For example, if one inverter unit out of the inverter units IU1 to IUn is broken down, the remaining inverter units will supply electric power to the load with a varied distribution rate. Consequently, the inverter units may be regarded as a reliable power source. The inverter units IU1 to IUn respectively comprise inverter circuits IC1 to ICn including a plurality of semiconductor switching elements; inverter control circuits CC1 to CCn which output a PWM control signal for PWM controlling the semiconductor switching elements of the inverter circuit; voltage detectors VD1 to VDn which respectively detect output voltages of the inverter circuit IC1 to ICn; current detectors ID1 to IDn which respectively detect output currents of the inverter circuits.

Figure 2:
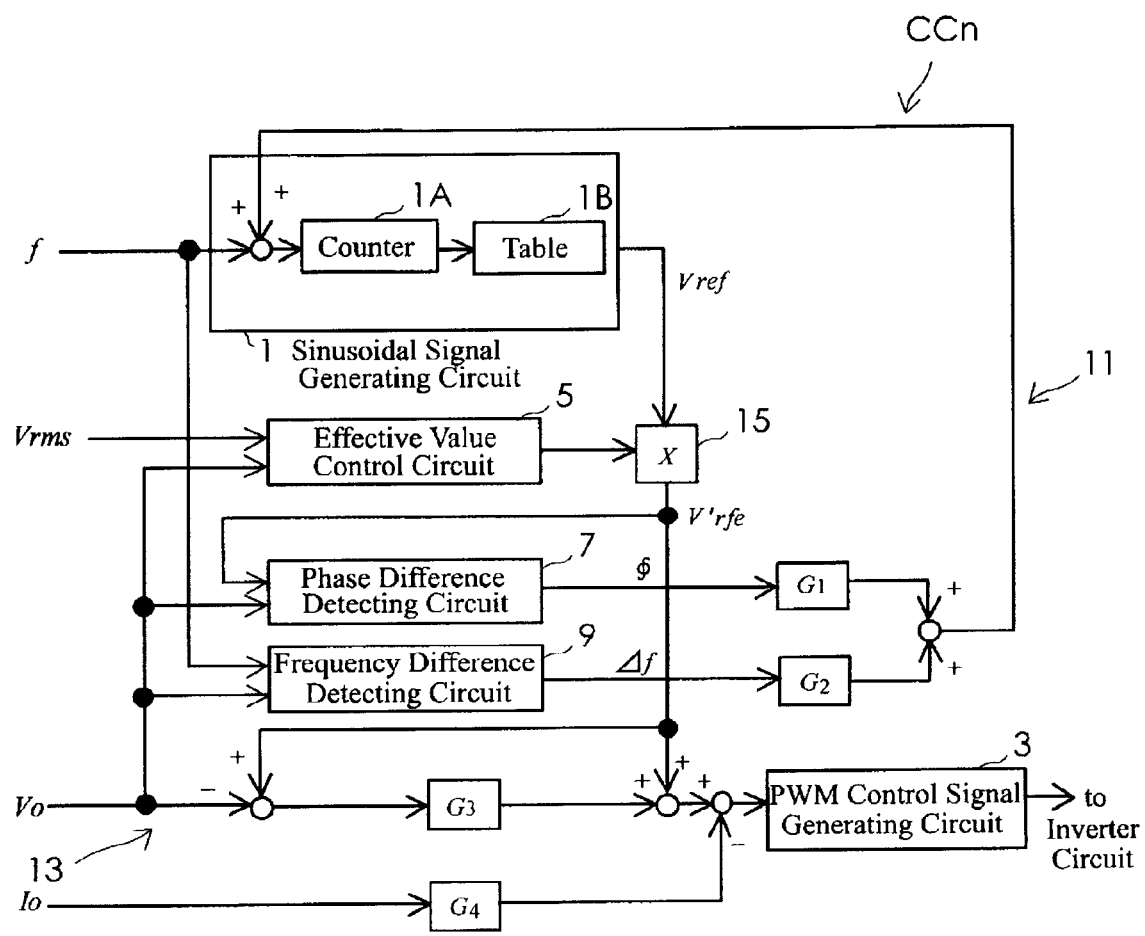
FIG. 2 is a block diagram illustrating an example configuration of an inverter control circuit.

The inverter control circuits CC1 to CCn of the inverter units IU1 to IUn are the same in configuration. In the following descriptions, the configuration of one inverter control circuit CCn which is used in one inverter unit IUn is described. FIG. 2 is a block diagram illustrating an example configuration of an inverter control circuit. The inverter control circuit CCn basically includes a sinusoidal signal generating circuit 1, a PWM control signal generating circuit 3, an effective value control circuit 5, a phase difference detecting circuit 7, a frequency difference detecting circuit 9, a feedback circuit 11, and an instantaneous control system 13. The sinusoidal signal generating circuit 1 outputs a sinusoidal signal $V_{ref}$ of frequency in accordance with a commanded value f for reference frequency when the commanded value f is inputted. In one or more embodiments of the present invention, the commanded value f for reference frequency is given to the sinusoidal signal generating circuit 1 as a fixed value. Specifically, the commanded value f for reference frequency is obtained by multiplying frequency by the number of data of sine waves by sampling time (commanded value f for reference frequency=frequency×No. of data of sine waves×sampling time). The sinusoidal signal generating circuit 1 is provided with a counter 1A and a table 1B. The counter 1A counts the commanded value f for reference frequency and outputs a counted value to the table 1B. The table 1B retains as table data amplitude data of the sine waves corresponding to the counted values. Thus, the table 1B outputs the amplitude data of the sine waves corresponding to the counted values in the counter 1A. As a result, the sinusoidal signal generating circuit 1 outputs a sinusoidal signal $V_{ref}$ of frequency indicated with the commanded value f for reference frequency. Since the counter 1A performs counting on the basis of a clock signal outputted from an oscillating source such as a crystal oscillator, the output accuracy of the sinusoidal signal circuit 1 is affected by the accuracy of the counter 1A. The commanded value f for reference frequency is inputted to the inverter units IU1 to IUn substantially at the same time once the electric power has been supplied to the system.

In one or more embodiments of the present invention, the effective value control circuit 5 may define a coefficient a used to determine an amplitude value for the sinusoidal signal required for setting an output from the inverter circuit ICn as an effective value indicated with a commanded value $V_{rms}$ for a reference effective value, based on the commanded value $V_{rms}$ for a reference effective value and an effective value for an output from the inverter circuit ICn obtained based on an output $V_o$ from the voltage detector VDn. The coefficient a indicates a modulation rate. As the effective value control circuit 5, for example, the configuration of an inverter control circuit may be employed as disclosed in FIG. 2 of Japanese Patent No. 3825665. In the configuration as illustrated in FIG. 2 of Japanese Patent No. 3825665, an output voltage (VOUT) from an inverter circuit (3a) is set as an effective value by a means for setting an effective value (27). A summing point (29) subtracts the output voltage set as an effective value from a signal obtained by subtracting a result of (POUT×G1 or G2) from the commanded value (Vo) for an effective value. An output from the summing point (29) is a difference between a compensated commanded value for an effective value and the output voltage (Vout). Then, the difference is inputted to a means for controlling an effective value (31) and the amplified difference is outputted therefrom. The output from the means for controlling an effective value (31) as illustrated in FIG. 2 of Japanese Patent No. 3825665 corresponds to the coefficient a of the embodiments of the present invention. Except for a variable gain means (23) as illustrated in FIG. 2 of Japanese Patent No. 3825665, if a transfer function in the means for controlling an effective value (31) is kp and an output from the means for controlling an effective value (31) is added to the commanded value (Vo) for an effective value, the coefficient a may be obtained.

The commanded value $V_{rms}$ for a reference effective value is a fixed value stored in a memory, not shown. An effective value of an output from the inverter circuit ICn is calculated using a publicly known circuit for calculating an effective value. The effective value control circuit 5 outputs the coefficient a required for setting the effective value obtained as describe above as the commanded value $V_{rms}$ for a reference effective value. A multiplier 15 multiplies the sinusoidal signal $V_{ref}$ by the coefficient a and outputs it as a reference sinusoidal signal $V'_{ref}$.

The phase difference detecting circuit 7 compares an output (a detected voltage signal V) from the voltage detector VDn, and obtains a phase difference between the detected voltage signal $V_o$ and the reference sinusoidal signal $V'_{ref}$. As the cross current increases, the phase difference between the detected voltage signal $V_o$ and the reference sinusoidal signal $V'_{ref}$ increases. As the cross current decreases, the phase difference between the detected voltage signal $V_o$ and the reference sinusoidal signal $V'_{ref}$ decreases. Ideally, if the phase difference is decreased to zero, it means that the cross current of the effective power component is decreased to zero. In one or more embodiments of the present invention, the frequency of the sinusoidal signal generating circuit 1 of the inverter circuit ICn may be adjusted so that the phase difference may be as close to zero as possible.

In one or more embodiments of the present invention, in order to allow the frequencies of the invert units to be consistent with each other as much as possible, in other words, to increase the frequency accuracy, the frequency difference detecting circuit 9 may be provided to obtain a frequency $f_o$ of an output of the inverter circuit ICn from the detected voltage signal $V_o$ outputted from the voltage detector VDn, and detect a frequency difference Δf between the obtained frequency $f_o$ and the commanded value f for reference frequency. A technology proposed by the inventors of the present invention in Japanese Patent Application Publication No. 2004-64515 (JP2004-64515A) may be employed to obtain the frequency of an output of the inverter circuit ICn from the detected voltage signal $V_o$ from the voltage detector VDn.

In one or more embodiments of the present invention, the feedback circuit 11 may input to the sinusoidal signal generating circuit 1 an addition result value obtained by adding to the commanded value f for reference frequency a gain-multiplied phase difference value obtained by multiplying the phase difference value ø by a predetermined gain G1, and a gain-multiplied frequency difference value obtained by multiplying the frequency difference Δf by a predetermined gain G2. Here, the gains G1 and G2 may appropriately be defined according to the characteristics of the phase difference detecting circuit 7 and those of the frequency difference detecting circuit 9. With this, not only the phase difference value ø but also the frequency difference Δf may be fed back, thereby increasing the frequency accuracy. The sinusoidal signal $V_{ref}$ of frequency, outputted from the sinusoidal signal generating circuit 1, is determined so that the phase difference and also the frequency difference may be as close to zero as possible. As a result, the frequency of the output of each inverter unit may be a value close to the commanded value for reference frequency though being affected by small cross current flowing in the inverter circuit unit.

The PWM control signal generating circuit 3 basically receives an addition result signal and outputs the PWM control signal. The addition result signal is a signal which is obtained by the instantaneous control system 13 as follows: the sinusoidal signal $V_{ref}$ is multiplied by the coefficient a to obtain the reference sinusoidal signal $V'_{ref}$; a difference signal between the reference sinusoidal signal $V'_{ref}$ and the output $V_o$ from the voltage detector VDn is multiplied by a predetermined gain G3; and the resulting signal and the reference sinusoidal signal $V'_{ref}$ are added to obtain the addition result signal. The instantaneous control system 13 performs feedback control to allow an output from the inverter circuit IVn to be close to the reference sinusoidal signal $V'_{ref}$. Here, the gain G3 is an ordinary feedback gain. In one or more embodiments of the present invention, the PWM control signal generating circuit may receive a subtraction result signal and outputs the PWM control signal. The subtraction result signal is obtained as follows: the sinusoidal signal $V_{ref}$ is multiplied by the coefficient a to obtain the reference sinusoidal signal $V'_{ref}$; the sinusoidal signal $V_{ref}$ is added to a difference signal between the reference sinusoidal signal $V'_{ref}$ and the output $V_o$ from the voltage detector VDn to obtain an addition result signal; an output $I_o$ from the current detector IDn is multiplied by a predetermined gain G4 to obtain a detected current signal; and the detected current signal is subtracted from the addition result signal to obtain the subtraction result signal. Here, the gain G4 is defined as a predetermined value to adjust the load distribution rate for the inverter circuit ICn driven by the inverter control circuit CCn. Thus, if the output current $I_o$ from the inverter unit IUn is fed back to the PWM control signal generating circuit 3, each inverter unit defines its own load distribution rate and is operating in parallel with other inverter units so that an occurrence of cross current may be suppressed. The description of the fundamental theory for adjusting the load distribution rate is omitted here since it is described in detail in Japanese Patent Publication No. 06-40704 (JP06-40704).

Figure 3:
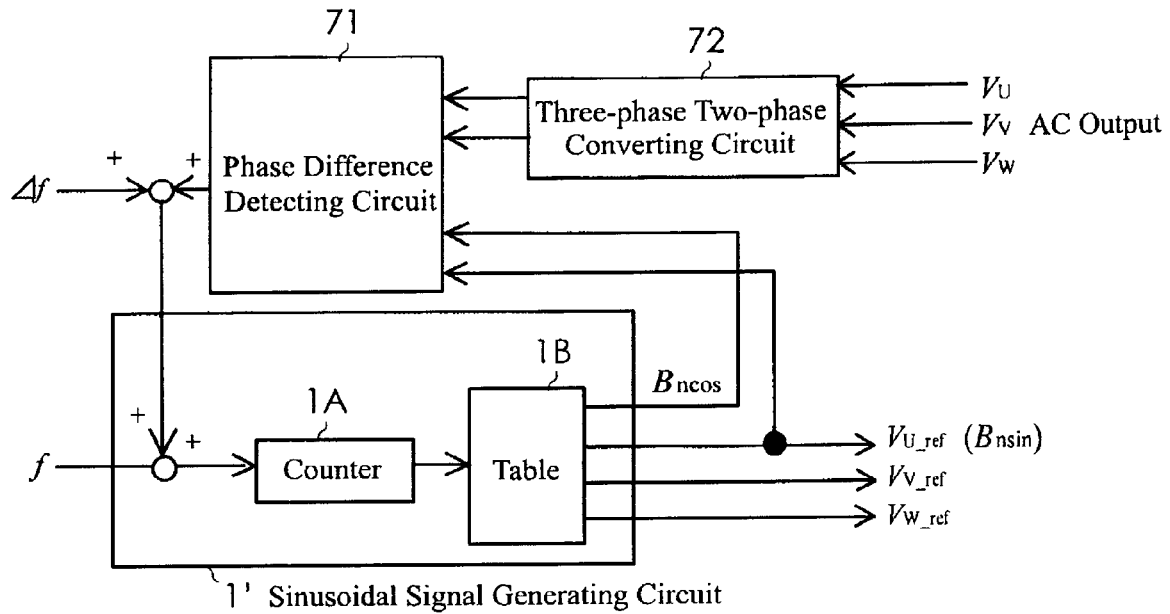
FIG. 3 illustrates an example phase difference detecting circuit for detecting a phase difference.

FIG. 3 is a block diagram illustrating an example circuit usable as the phase difference detecting circuit 7 when the inverter circuit generates a three-phase AC output. In the illustrated circuit, a three-phase two-phase converting circuit 72 converts three-phase signals to two-phase signals and inputs the converted two-phase signals to a phase difference detector 71. Data of sine waves ($B_{n\,sin}=\sin(\omega_s t)$) and cosine waves ($B_{n\,cos}=\cos(\omega_s t)$) are stored in advance in the table 1B of the sinusoidal signal generating circuit 1. Among the data stored therein, the cosine wave signal based on the U phase, and a signal corresponding to the U phase out of the three-phase sinusoidal signals having a 120-degree phase difference, outputted from the sinusoidal signal generating circuit 1' are inputted as two-phase signals ($B_{n\,sin}$, $B_{n\,cos}$) to the phase difference detector 71. The three-phase two-phase conversion carried out by the three-phase two-phase converting circuit 72 is expressed as follows:

$$\begin{bmatrix} A_{ncos} \\ A_{nsin} \end{bmatrix} = \sqrt{\frac{2}{3}} \begin{bmatrix} 1 & -1/2 & -1/2 \\ 0 & \sqrt{3}/2 & -\sqrt{3}/2 \end{bmatrix} \begin{bmatrix} V_u \\ V_v \\ V_w \end{bmatrix} \quad <\text{Expression 1}>$$

$$= \begin{bmatrix} A_1 \sin(\omega t) \\ A_2 \sin(\omega t - \pi/2) \end{bmatrix}$$

$$= \begin{bmatrix} A_1 \cos(\omega t + \phi) \\ A_2 \sin(\omega t + \phi) \end{bmatrix}$$

where $V_u$, $V_v$, and $V_w$ are expressed respectively below:

$V_u = \sqrt{2} V_u \sin(\omega t)$ <Expression 2>

$V_v = \sqrt{2} V_v \sin(\omega t - 2\pi/3)$ $V_w = \sqrt{2} V_w \sin(\omega t - 4\pi/3)$ where $V_u$, $V_v$, and $V_w$ are instantaneous values of AC output voltages of the U-phase, V-phase, and W-phase, respectively.

The angular frequency of an output from the inverter unit should be $\omega_s$ in accordance with the angular frequencies $\omega_s$ of the sine wave ($B_{n\,sin}=\sin(\omega_s t)$) and the cosine wave ($B_{n\,cos}=\cos(\omega_s t)$) outputted from the sinusoidal signal generating circuit 1'. However, the angular frequency of an output from the inverter unit will not be $\omega_s$ due to phase shifting caused by cross current control of other inverter units. The angular frequency w of the inverter output is close to $\omega_s$. The relationship of a three-phase two-phase converted output voltage signal with a signal outputted from the sinusoidal signal generating circuit 1' is expressed, as shown below, on a basis of the signal outputted from the sinusoidal signal generating circuit 1'.

$$A \sin((\omega - \omega_s)t + \phi) = A \sin(\omega t + \phi) \cdot \cos(\omega_s t) - \quad <\text{Expression 3}>$$

$$A \cos(\omega t + \phi) \cdot \sin(\omega_s t)$$

$$= A_{nsin} B_{ncos} - A_{ncos} B_{nsin}$$

If the angular frequency $\omega_s$ of the inverter output and the angular frequency $\omega_s$ of the output from the sinusoidal signal generating circuit 1' are substantially the same, the phase difference ø is expressed, as shown below, in the vicinity of zero.

$\phi \cong (A_{n\,sin} B_{n\,cos} - A_{n\,cos} B_{n\,sin})/A$ <Expression 4>

The phase difference detector 71 obtains a phase difference ø by the above-identified approximation.

Figure 4:
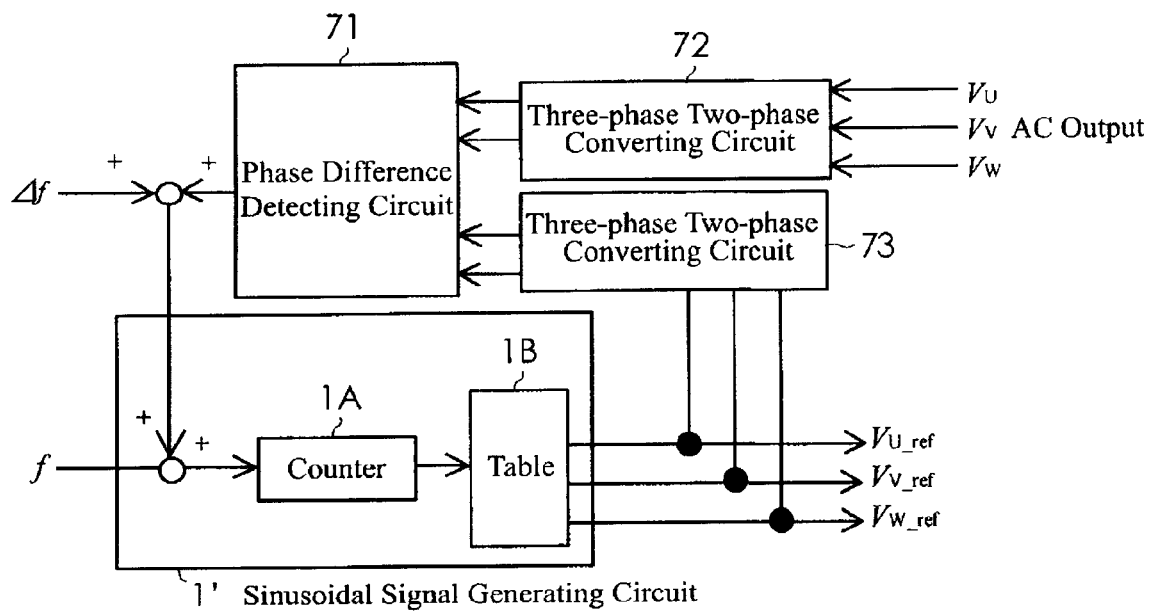
FIG. 4 illustrates another example phase difference detecting circuit for detecting a phase difference.

In a variation example illustrated in FIG. 4, three-phase signals from the sinusoidal signal generating circuit 1' are converted to two-phase signals, which are then inputted to the phase difference detector 71. In this configuration, an approximate phase difference ø may be obtained as with the above-identified expression.

Figure 5:
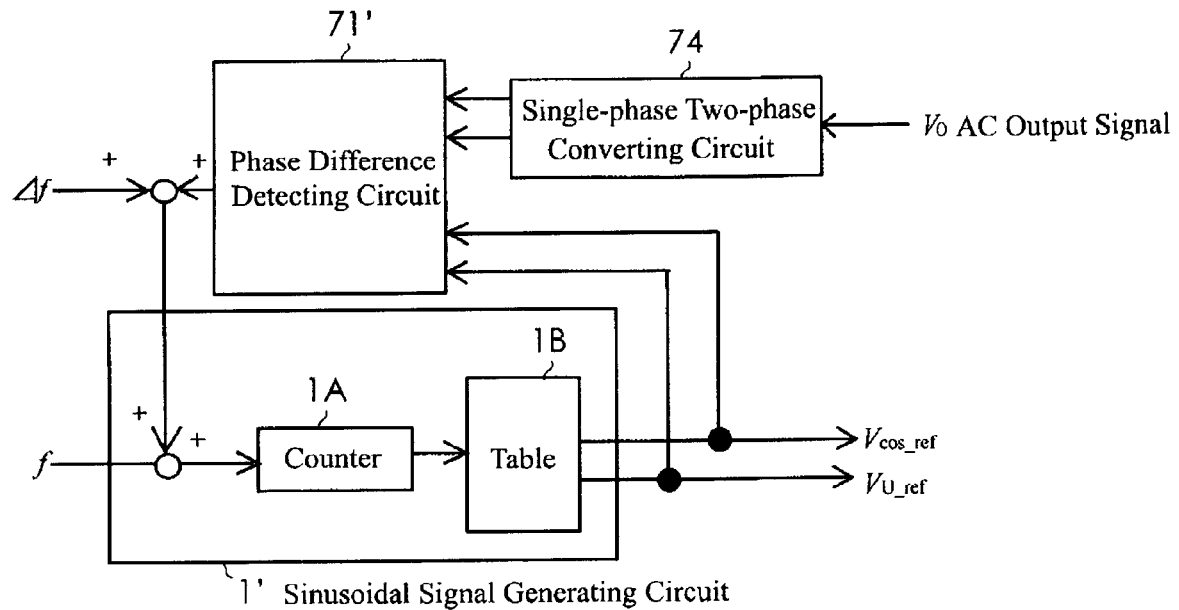
FIG. 5 illustrates a further example phase difference detecting circuit for detecting a phase difference.
Figure 6:
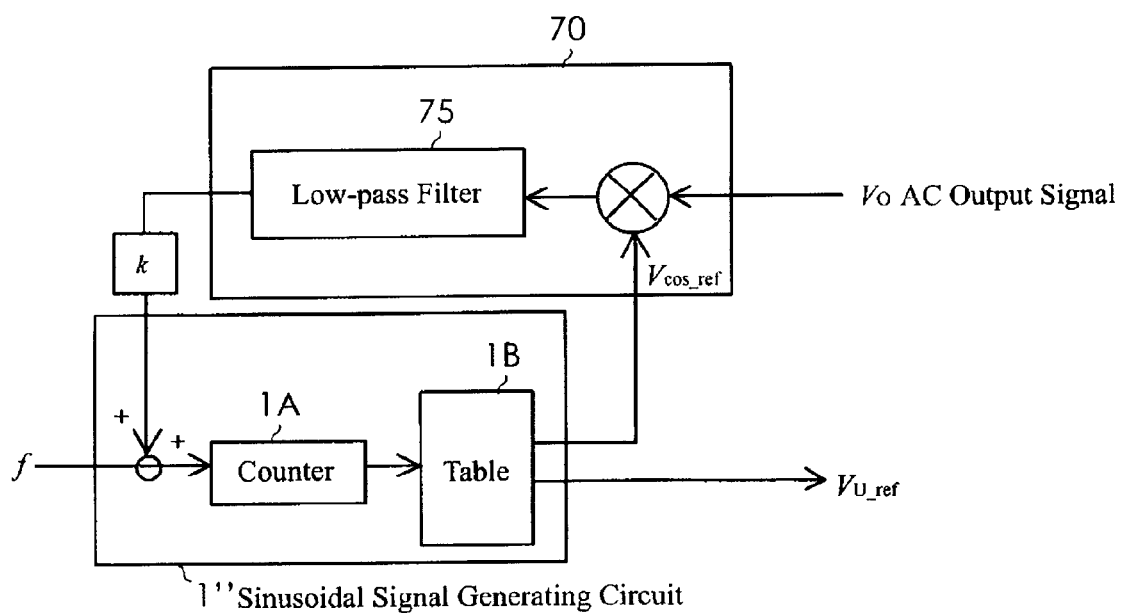
FIG. 6 illustrates an even another example phase difference detecting circuit for detecting a phase difference.

FIG. 5 is a block diagram illustrating an example circuit for detecting a phase difference o from a single-phase AC output signal $V_o$. A single-phase signal is converted to two-phase signals by the single-phase two-phase converting circuit 74. Then, a phase difference ø is detected by the phase difference detector 71. In the single-phase two-phase conversion, $A_{n\,cos}=\cos(\omega t)$ component is expressed as shown below, provided that a single-phase signal is $A_{sin}=\sin(\omega t)$, and then is converted to the two-phase signals.

$$A_{n\,cos} \cong (A_{n\,sin} - A_{n-1\,sin})/\Delta t \qquad \text{<Expression 5>}$$

where $\Delta t$ is the sampling time. A single-phase PLL circuit (phase difference detecting circuit) 70 as illustrated in FIG. 6 may also obtain a phase difference. In FIG. 6, an AC output signal is multiplied by a cosine wave outputted from the sinusoidal signal generating circuit 1" as shown below.

$$\begin{aligned} A_{nsin}B_{ncos} &= A\sin(\omega t + \phi)\cdot \cos(\omega_s t) \qquad \text{< Expression 6 >}\\ &= \frac{A}{2}\{\sin((\omega - \omega_s)t + \phi) + \\ &\quad \sin((\omega + \omega_s)t + \phi)\}\\ &\cong \frac{A}{2}\{\sin(\phi) + \sin((\omega + \omega_s)t + \phi)\} \end{aligned}$$

A twofold frequency component may be removed by filtering a multiplication of the inverter output signal $V_o$ and the cosine wave signal outputted from the sinusoidal signal generating circuit 1" through a low-pass filter 75. Then, the above-identified expression is represented as shown below.

$$\begin{aligned} \phi &\cong \sin(\phi) \qquad \text{< Expression 7 >}\\ &\cong \{\sin(\phi) + \sin((\omega + \omega_s)t + \phi)\}\\ &\cong (A_{nsin}B_{ncos}) \times 2/A \end{aligned}$$

The output from the low-pass filter 75 indicates a phase difference ø.

The frequency difference detecting circuit 9 may arbitrarily be configured. For example, if the phase difference detector 70 as illustrated in FIG. 6 is used, an output frequency $f_o$ may be obtained at the position illustrated in FIG. 7, and a difference $\Delta f$ from the commanded value f for reference frequency may be obtained. The PLL circuit 70 illustrated in FIG. 7 may be synchronized with the output voltage. The output frequency $f_o$ may also be obtained from an output signal from the PLL circuit 70.

Figure 7:
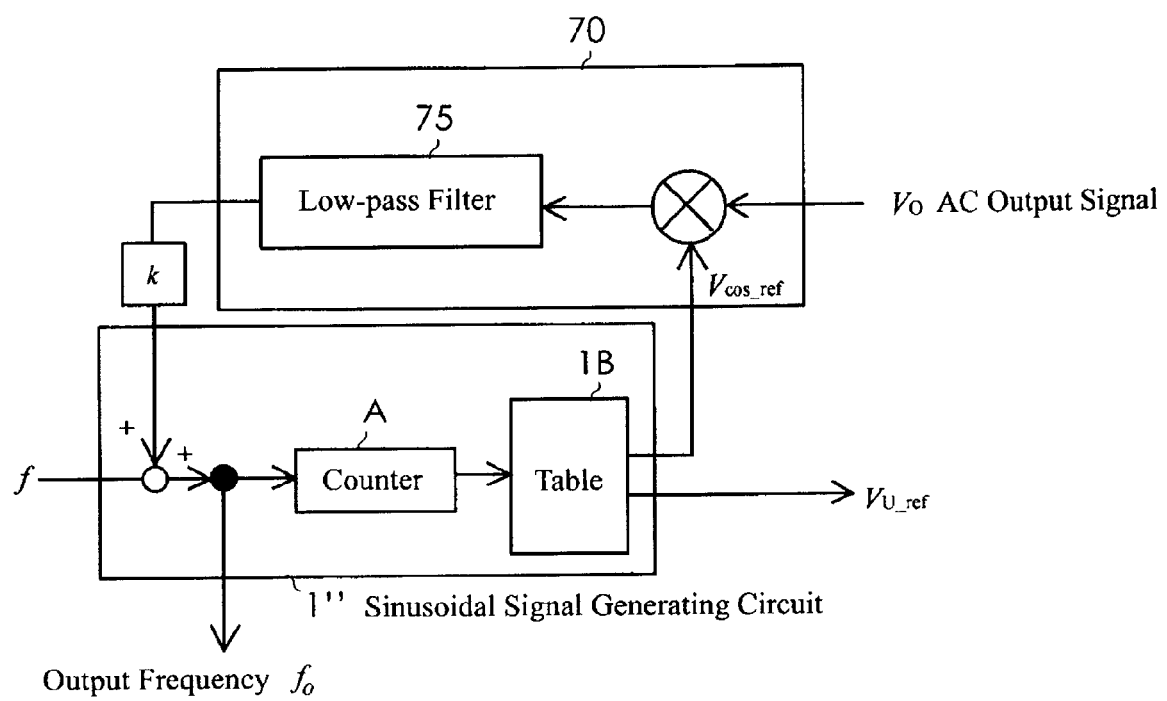
FIG. 7 illustrates an example circuit for obtaining an output frequency by using a PLL circuit.

If a PLL circuit, which may be synchronized with an output voltage, is used as illustrated in FIG. 7, a signal which is inputted to an address of the counter 1A indicates the frequency $f_o$ of the output voltage $V_o$. Therefore, a frequency difference $\Delta f$ may be obtained from a difference between a value $f_o$ inputted to a memory (or an address) of the counter 1A and the commanded value f for reference frequency. The output frequency $f_o$ may be obtained as shown below, using a signal which is obtained by two-phase converting the AC output signal by the three-phase two-phase converting circuit 72 illustrated in FIG. 3 or the single-phase two-phase converting circuit 74 illustrated in FIG. 5.

$$\begin{aligned} f_o &= (\omega \cdot t_s)/2\pi t_s \qquad \text{< Expression 8 >}\\ &= \omega(t_n - t_{n-1})/2\pi t_s\\ &\cong \sin(\omega(t_n - t_{n-1}))/2\pi t_s\\ &= \{\sin(\omega t_n)\cdot \cos(\omega t_{n-1}) - \\ &\quad \cos(\omega t_n)\cdot \sin(\omega t_{n-1})\}/2\pi t_s\\ &= (C_{nsin}C_{n-1cos} - C_{ncos}C_{n-1sin})/2\pi t_s \end{aligned}$$

where a subscript n of $C_{n\,sin}$ stands for the nth sampling value and n−1 for the n−1th sampling value. A frequency difference $\Delta f$ may also be obtained from a difference between the output frequency $f_o$ and the commanded value f for reference frequency.

A circuit described in Japanese Patent Application Publication No. 2004-64515 (JP2004-64515A) titled "Periodic Signal Controller and Frequency Detector" may be employed as a frequency difference detecting circuit. This discloses that the following expression is used to obtain a frequency difference $\Delta\omega$ between the frequency $\omega_s$ and the output frequency $\omega_o$.

$$\begin{aligned} \Delta\omega \cdot t_s &\cong \sin(\Delta\omega(t_n - t_{n-1})) \qquad \text{< Expression 9 >}\\ &= \sin(\Delta\omega t_n + \phi_2)\cdot \cos(\Delta\omega t_{n-1} + \phi_2) - \\ &\quad \cos(\Delta\omega t_n + \phi_2)\cdot \sin(\Delta\omega t_{n-1} + \phi_2)\\ &= D_{nsin}D_{n-1cos} - D_{ncos}D_{n-1sin} \end{aligned}$$

where $$D_{nsin} = \sin((\omega_s - \omega_o)t + \phi_2) = B_{nsin}C_{ncos} - B_{ncos}C_{nsin}$$
$$D_{ncos} = \cos((\omega_s - \omega_o)t + \phi_2) = B_{ncos}C_{ncos} + B_{nsin}C_{nsin}$$

The output frequency of the inverter units IU1 to IUn each including an inverter control circuit illustrated in FIG. 1 is close to a frequency indicated with the commanded value f for reference frequency. The outputs from the inverter units IU1 to IUn are synchronized. Thus, in one or more embodiments of the present invention, no dedicated line is needed for synchronizing the inverter units.

Figure 8:
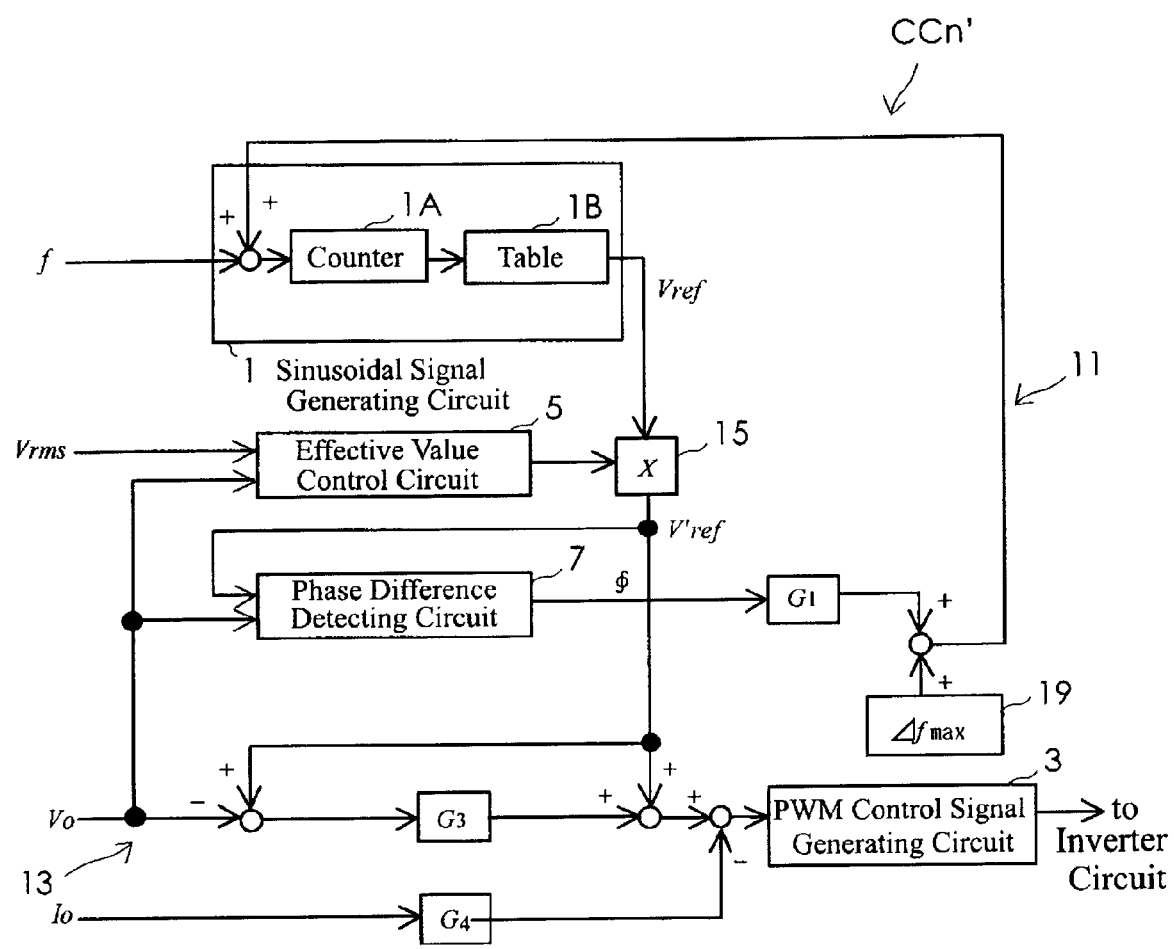
FIG. 8 is a block diagram illustrating another example of an inverter control circuit.

Instead of using the frequency difference detecting circuit 9 illustrated in FIG. 2, a means for storing a maximum frequency difference 19 may be provided as with an inverter control circuit CCn' illustrated in FIG. 8. The means for storing a maximum frequency difference 19 stores a maximum frequency difference equivalent value which is equivalent to the maximum frequency difference $\Delta f_{max}$ defined by a circuit constant of the inverter circuit IC. In FIG. 8, parts similar to those of the inverter control circuit CCn illustrated in FIG. 2 are designated with the same reference numerals or symbols and descriptions thereof are omitted. In the inverter control circuit CCn' of FIG. 8, the feedback circuit 11 is configured to input to the sinusoidal signal generating circuit 1 an addition result value obtained by adding to the commanded value f for reference frequency a gain-multiplied phase difference value obtained by multiplying the phase difference ø by the predetermined gain G1 and the maximum frequency difference equivalent value which is equivalent to the maximum frequency difference $\Delta f_{max}$. In this configuration, the frequency difference information on the maximum frequency difference $\Delta f_{max}$ defined by the circuit constant is fed back, thereby increasing the frequency accuracy although it may be lower than when actually detecting the frequency difference.

Figure 9:
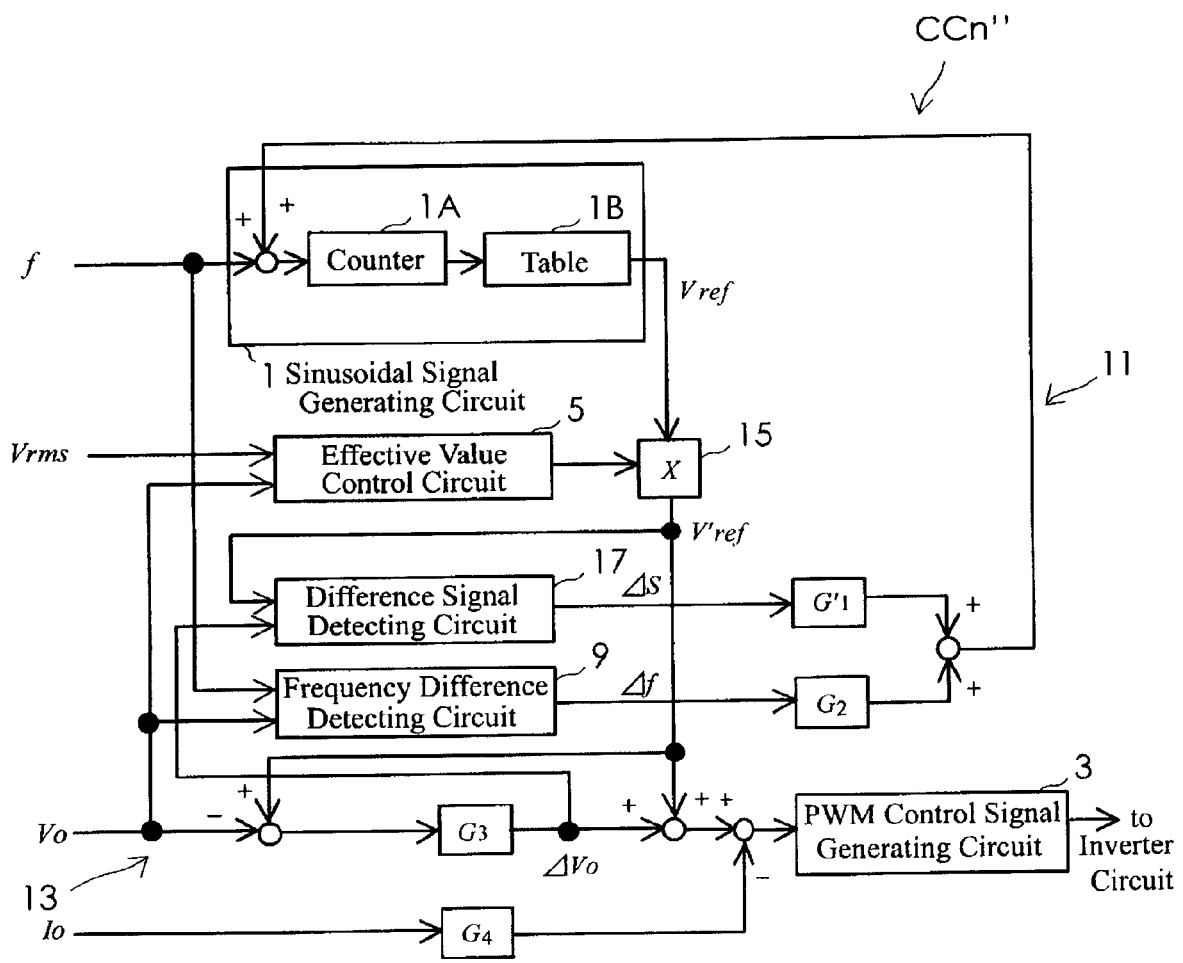
FIG. 9 is a block diagram illustrating an even another example of an inverter control circuit.

As with the inverter control circuit CCn" illustrated in FIG. 9, instead of the phase difference detecting circuit 7 illustrated in FIG. 2, a difference signal detecting circuit 17 may be used, which compares the gain-multiplied difference signal, which is obtained by multiplying a difference signal between the reference sinusoidal signal V'$_{ref}$ obtained by multiplying the sinusoidal signal V'$_{ref}$ by the coefficient a and the detected voltage signal V$_o$ outputted from the voltage detector VDn by a predetermined gain G'1, with the reference sinusoidal signal V'$_{ref}$ and obtains a difference signal (phase difference equivalent difference signal) which is equivalent to a phase difference ø between the output $V_o$ from the voltage detector VDn and the reference sinusoidal signal $V'_{ref}$. The feedback circuit 11 is configured to input to the sinusoidal signal generating circuit 1 an addition result value obtained by adding to the commanded value f for reference frequency a value obtained by multiplying the difference signal Δs equivalent to the phase difference by the predetermined gain G'1 and a value obtained by multiplying the frequency difference Δf by the predetermined gain G2. With the difference signal detecting circuit 17, the same result may be obtained as when directly detecting the phase difference. For example, if slight phase shifting occurs between the reference sinusoidal signal and the output voltage, an output from the difference signal detecting circuit 17 may appear as an AC signal which is shifted ahead or behind by 90 degrees from the phase of the reference sinusoidal signal or output voltage (of which the phases are slightly shifted but substantially the same). In other words, a slight phase difference appears as a large one. If the phase difference is controlled by calculation similar to the one carried out by the phase difference detecting circuit 7, the same result may be obtained.

Figure 10:
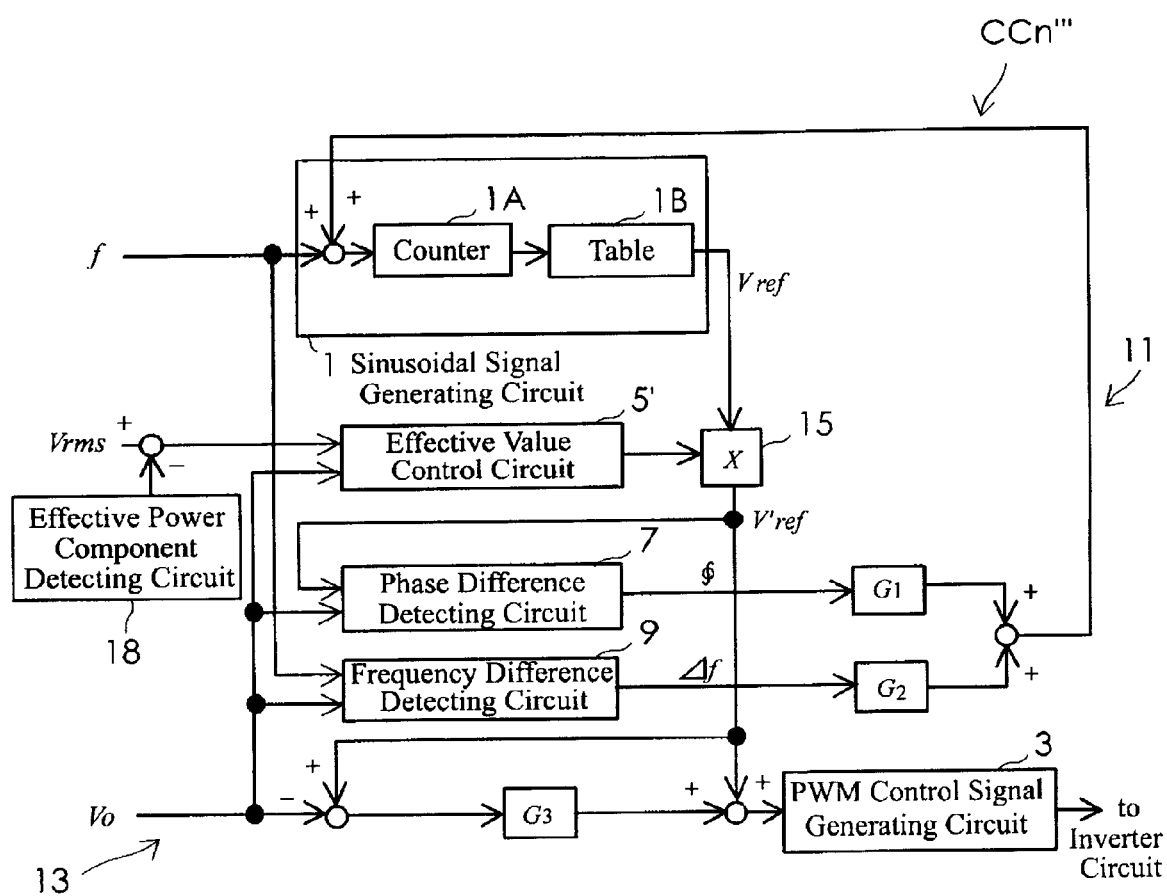
FIG. 10 is a block diagram illustrating a yet further example of an inverter control circuit.

Other technologies which do not feed back the detected current to the PWM control signal generating circuit 3 may be employed to suppress cross current. For example, in an inverter control circuit CCn''' illustrated in FIG. 10, an effective power component detecting circuit 18 is provided to obtain an effective power component based on an output $V_o$ from the voltage detector VDn and an output $I_o$ from the current detector IDn. The inverter control circuit includes an effective value control circuit 5' which defines the coefficient a used to determine an amplitude value for the sinusoidal signal required for setting an output from the inverter circuit as an effective value indicated with the commanded value $V_{rms}$ for a reference effective value, based on a value obtained by subtracting the effective power component from the commanded value $V_{rms}$ for a reference effective value and an effective value for an output from the inverter circuit obtained based on the detected voltage signal $V_o$ from the voltage detector VDn. Thus, cross current may also be suppressed by subtracting the effective power component from the commanded value for a reference effective value. The fundamental principles for suppressing an occurrence of cross current are substantially the same as those for suppressing cross current as disclosed in Japanese Patent Publication 06-40704 (JP06-40704) and Japanese Patent No. 3825665. In a configuration shown in FIG. 2 of Japanese Patent No. 3825665, an output current is subtracted from an output from a differential amplifying circuit (34). In contrast therewith, in one or more embodiments of the present invention, substantially the same result may be obtained without subtraction of the output current.

In the embodiments of the present invention described above, the frequency difference Δf is fed back. A satisfactory result may be obtained if only the phase difference ø is fed back.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A parallel inverter system comprising a plurality of inverter units which are connected in parallel and operating in parallel to supply electric power to a load, the inverter units each comprising:
   an inverter circuit including a plurality of semiconductor switching elements;
   a voltage detector which detects an output voltage of the inverter circuit;
   a current detector which detects an output current of the inverter circuit; and
   an inverter control circuit which outputs a PWM control signal for PWM controlling the semiconductor switching elements of the inverter circuit,
   the inverter control circuit including:
      a sinusoidal signal generating circuit which generates a sinusoidal signal of frequency in accordance with a commanded value for reference frequency when the commanded value is inputted;
      a PWM control signal generating circuit which receives an addition result signal and outputs the PWM control signal, wherein the addition result signal is obtained by adding a reference sinusoidal signal obtained by multiplying the sinusoidal signal by a predetermined coefficient and a gain-multiplied difference signal obtained by multiplying a difference signal between the reference sinusoidal signal and a detected voltage signal outputted from the voltage detector by a predetermined gain;
      a phase difference detecting circuit which obtains a phase difference between the detected voltage signal outputted from the voltage detector and the reference sinusoidal signal; and
      a feedback circuit which inputs to the sinusoidal signal generating circuit an addition result value obtained by adding to the commanded value for reference frequency a gain-multiplied phase difference value obtained by multiplying the phase difference value by a predetermined gain.

2. The parallel inverter system according to claim 1, wherein
   the inverter control circuit of the inverter unit further comprises a frequency difference detecting circuit which obtains a frequency from the detected voltage signal outputted from the voltage detector, and detects a frequency difference between the obtained frequency and a frequency indicated with the commanded value for reference frequency; and
   the feedback circuit is configured to input to the sinusoidal signal generating circuit an addition result value which is obtained by adding to the commanded value for reference frequency the gain-multiplied phase difference value and a gain-multiplied frequency difference value obtained by multiplying the frequency difference by a predetermined gain.

3. The parallel inverter system according to claim 1, further comprising a means for storing a maximum frequency difference which stores a maximum frequency difference equivalent value which is equivalent to the maximum frequency difference defined by a circuit constant of the inverter circuit, wherein
   the feedback circuit is configured to input to the sinusoidal signal generating circuit an addition result value obtained by adding the gain-multiplied phase difference value and the maximum frequency difference equivalent value to the commanded value for reference frequency.

4. The parallel inverter system according to claim 2, wherein
the phase difference detecting circuit comprises a difference signal detecting circuit which compares the gain-multiplied difference signal, which is obtained by multiplying a difference signal between the reference sinusoidal signal and the detected voltage signal outputted from the voltage detector by a predetermined gain, with the reference sinusoidal signal and obtains a phase difference equivalent difference signal which is equivalent to a phase difference between the detected voltage signal and the reference sinusoidal signal; and
the feedback circuit is configured to input to the sinusoidal signal generating circuit an addition result value obtained by adding to the commanded value for reference frequency a value obtained by multiplying the phase difference equivalent difference signal by a predetermined gain and the gain-multiplied frequency difference value obtained by multiplying the frequency difference by a predetermined gain.

5. The parallel inverter system according to claim 2, wherein
the inverter control circuit of the inverter unit further comprises an effective value control circuit which defines the predetermined coefficient used to determine an amplitude value for the sinusoidal signal required for setting an output from the inverter circuit as an effective value indicated with a commanded value for a reference effective value, based on the commanded value for a reference effective value and an effective value for an output from the inverter circuit obtained based on the detected voltage signal from the voltage detector; and
the PWM control signal generating circuit is configured to receive a subtraction result signal and outputs the PWM control signal, wherein the subtraction result signal is obtained by subtracting a detected current signal obtained by multiplying an output from the current detector by a predetermined gain from an addition result signal obtained by adding the reference sinusoidal signal obtained by multiplying the sinusoidal signal by the predetermined coefficient and the gain-multiplied difference signal obtained by multiplying a difference signal between the reference sinusoidal signal and the detected voltage signal by a predetermined gain.

6. The parallel inverter system according to claim 1, wherein
the inverter control circuit of the inverter unit further comprises:
an effective power component detecting circuit which obtains an effective power component based on an output from the voltage detector and an output from the current detector;
an effective value control circuit which defines the predetermined coefficient used to determine an amplitude value for the sinusoidal signal required for setting an output from the inverter circuit as an effective value indicated with the commanded value for a reference effective value, based on a value obtained by subtracting the effective power component from the commanded value for a reference effective value and an effective value for an output from the inverter circuit obtained based on the detected voltage signal from the voltage detector; and a frequency difference detecting circuit which obtains a frequency from an output of the voltage detector, and detects a frequency difference between the obtained frequency and a frequency indicated with the commanded value for reference frequency; and
the feedback circuit is configured to input to the sinusoidal signal generating circuit an addition result value obtained by adding to the commanded value for reference frequency a value obtained by multiplying the phase difference by a predetermined gain and a value obtained by multiplying the frequency difference by a predetermined gain.

7. The parallel inverter system according to claim 3, wherein
the inverter control circuit of the inverter unit further comprises an effective value control circuit which defines the predetermined coefficient used to determine an amplitude value for the sinusoidal signal required for setting an output from the inverter circuit as an effective value indicated with a commanded value for a reference effective value, based on the commanded value for a reference effective value and an effective value for an output from the inverter circuit obtained based on the detected voltage signal from the voltage detector; and
the PWM control signal generating circuit is configured to receive a subtraction result signal and outputs the PWM control signal, wherein the subtraction result signal is obtained by subtracting a detected current signal obtained by multiplying an output from the current detector by a predetermined gain from an addition result signal obtained by adding the reference sinusoidal signal obtained by multiplying the sinusoidal signal by the predetermined coefficient and the gain-multiplied difference signal obtained by multiplying a difference signal between the reference sinusoidal signal and the detected voltage signal by a predetermined gain.

8. The parallel inverter system according to claim 4, wherein
the inverter control circuit of the inverter unit further comprises an effective value control circuit which defines the predetermined coefficient used to determine an amplitude value for the sinusoidal signal required for setting an output from the inverter circuit as an effective value indicated with a commanded value for a reference effective value, based on the commanded value for a reference effective value and an effective value for an output from the inverter circuit obtained based on the detected voltage signal from the voltage detector; and
the PWM control signal generating circuit is configured to receive a subtraction result signal and outputs the PWM control signal, wherein the subtraction result signal is obtained by subtracting a detected current signal obtained by multiplying an output from the current detector by a predetermined gain from an addition result signal obtained by adding the reference sinusoidal signal obtained by multiplying the sinusoidal signal by the predetermined coefficient and the gain-multiplied difference signal obtained by multiplying a difference signal between the reference sinusoidal signal and the detected voltage signal by a predetermined gain.

* * * * *